US012272858B2

(12) United States Patent
Crouch

(10) Patent No.: US 12,272,858 B2
(45) Date of Patent: Apr. 8, 2025

(54) RIDGED N-WAY COAXIAL VACUUM POWER COMBINER SIGNAL INJECTOR WITH RADIAL FEEDS USABLE IN A COAXIAL VACUUM-ELECTRON DEVICE

(71) Applicant: Raytheon Company, Arlington, VA (US)

(72) Inventor: David D. Crouch, Farragut, TN (US)

(73) Assignee: Raytheon Company, Arlington, VA (US)

( * ) Notice: Subject to any disclaimer, the term of this patent is extended or adjusted under 35 U.S.C. 154(b) by 123 days.

(21) Appl. No.: 17/991,431

(22) Filed: Nov. 21, 2022

(65) Prior Publication Data

US 2024/0170824 A1 May 23, 2024

(51) Int. Cl.

| | |
|---|---|
| ***H01P 5/12*** | (2006.01) |
| ***H01J 23/12*** | (2006.01) |
| ***H01J 23/14*** | (2006.01) |
| ***H01P 1/16*** | (2006.01) |
| ***H01P 3/06*** | (2006.01) |
| ***H01P 5/16*** | (2006.01) |

(52) U.S. Cl.

CPC ................ *H01P 5/12* (2013.01); *H01J 23/12* (2013.01); *H01J 23/14* (2013.01); *H01P 1/16* (2013.01); *H01P 3/06* (2013.01); *H01P 5/16* (2013.01)

(58) Field of Classification Search

CPC ............. H01P 5/12; H01J 12/12; H01J 23/14

(Continued)

(56) References Cited

U.S. PATENT DOCUMENTS 4,598,254 A * 7/1986 Saito et al. ............... H01P 5/12 333/125
4,912,366 A 3/1990 Dionne
(Continued)

OTHER PUBLICATIONS

"U.S. Appl. No. 17/991,460, Non Final Office Action mailed Sep. 10, 2024", 9 pgs.

(Continued)

*Primary Examiner* — Benny T Lee
(74) *Attorney, Agent, or Firm* — Schwegman Lundberg & Woessner, P.A.

(57) ABSTRACT

A radially-fed RF power combiner combines a plurality of input signals to generate a single fundamental-mode transverse electromagnetic (TEM) output. The combiner comprises a vacuum coaxial transmission line having a plurality of coaxial vacuum feedthroughs configured to receive the input signals. The feedthroughs are arranged radially around the vacuum coaxial transmission line. The inner conductive surface of the vacuum coaxial transmission line may comprise a cylindrical conductive base and a plurality of radially-aligned conductive ridges azimuthally distributed within a vacuum envelope of the vacuum coaxial transmission line. Each of the conductive ridges may be coupled to a center conductor of a corresponding one of the coaxial vacuum feedthroughs. The conductive ridges may have a taper to provide an increasing gap between the top of the conductive ridges and an outer conductive surface of the vacuum coaxial transmission line. The increasing gap may gradually transition the input signals from each coaxial vacuum feedthrough to quasi-TEM mode signals within the vacuum envelope allowing the quasi-TEM mode signals from each conductive ridge to spread azimuthally within the vacuum envelope and combine to generate a substantially pure TEM mode signal.

20 Claims, 6 Drawing Sheets

(58) Field of Classification Search
USPC ........................ 333/125; 315/5.14, 5.16, 5.29
See application file for complete search history.

(56) References Cited

U.S. PATENT DOCUMENTS

| | | | | | |
|---|---|---|---|---|---|
| 5,235,249 | A | * | 8/1993 | Mourier .................. | H01J 25/12 315/5.39 |
| 9,819,320 | B1 | | 11/2017 | Hoff et al. | |
| 2024/0170826 | A1 | | 5/2024 | Crouch et al. | |

OTHER PUBLICATIONS

"U.S. Appl. No. 17/991,460, Response filed Nov. 12, 2024 to Non Final Office Action mailed Sep. 10, 2024", 12 pgs.

* cited by examiner

RIDGED N-WAY COAXIAL VACUUM POWER COMBINER SIGNAL INJECTOR WITH RADIAL FEEDS USABLE IN A COAXIAL VACUUM-ELECTRON DEVICE

RELATED APPLICATION

This application is related to patent application Ser. No. 17/991,460 entitled "N-WAY COAXIAL SIGNAL INJECTOR WITH AXIAL FEEDS" filed Nov. 21, 2022.

TECHNICAL FIELD

Embodiments pertain to high-power RF signal combiners and signal injectors. Some embodiments relate to vacuum coaxial transmission lines. Some embodiments relate to coaxial signal injectors configured to deliver a drive signal to a coaxial traveling-wave tube (CoTWT).

BACKGROUND

Vacuum high-power amplifiers currently under development utilize highly over-moded coaxial structures as electron beam-wave interaction regions. That is, the beam and the wave interact between the center and outer conductors of a large evacuated coaxial structure. The input of vacuum high-power amplifiers is desirably driven by a large number of independent yet coherent RF sources that need to be combined to generate a high-purity transverse electromagnetic (TEM) wave that minimizes the presence of unwanted higher-order waveguide modes.

Thus, what is needed is an apparatus that can combine signals from a number of RF sources to generate a high-purity transverse electromagnetic (TEM) wave. What is also needed is an apparatus that can combine signals from a number of RF sources to generate a high-purity TEM wave for input to an amplifying coaxial vacuum-electron device (CoVED) such as a coaxial traveling wave tube (CoTWT).

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments disclosed herein are directed to power combiners that can combine signals from a number of RF sources to generate a high-purity transverse electromagnetic (TEM) wave. Some embodiments disclosed herein are directed to coaxial signal injectors configured to deliver a drive signal to an amplifying coaxial vacuum-electron device (CoVED), such as a coaxial traveling-wave tube (CoTWT). Some embodiments are directed to generation of a high-purity TEM signal for delivery to a beam-wave interaction region such as a slow-wave structure. These embodiments, as well as other are described in more detail below where like features are denoted by the same reference labels throughout the detail description of the drawings.

In some embodiments, a radially-fed RF power combiner combines a plurality of input signals to generate a single fundamental-mode transverse electromagnetic (TEM) output. The combiner comprises a vacuum coaxial transmission line having a plurality of coaxial vacuum feedthroughs configured to receive the input signals. The feedthroughs are arranged radially around the vacuum coaxial transmission line. The inner conductive surface of the vacuum coaxial transmission line may comprise a cylindrical conductive base and a plurality of radially-aligned conductive ridges azimuthally distributed within a vacuum envelope of the vacuum coaxial transmission line. Each of the conductive ridges may be coupled to a center conductor of a corresponding one of the coaxial vacuum feedthroughs. The conductive ridges may have a taper to provide an increasing gap between the top of the conductive ridges and an outer conductive surface of the vacuum coaxial transmission line. The increasing gap may gradually transition the input signals from each coaxial vacuum feedthrough to quasi-TEM mode signals within the vacuum envelope allowing the quasi-TEM mode signals from each conductive ridge to spread azimuthally within the vacuum envelope and combine to generate a substantially pure TEM mode signal.

Figure 1:
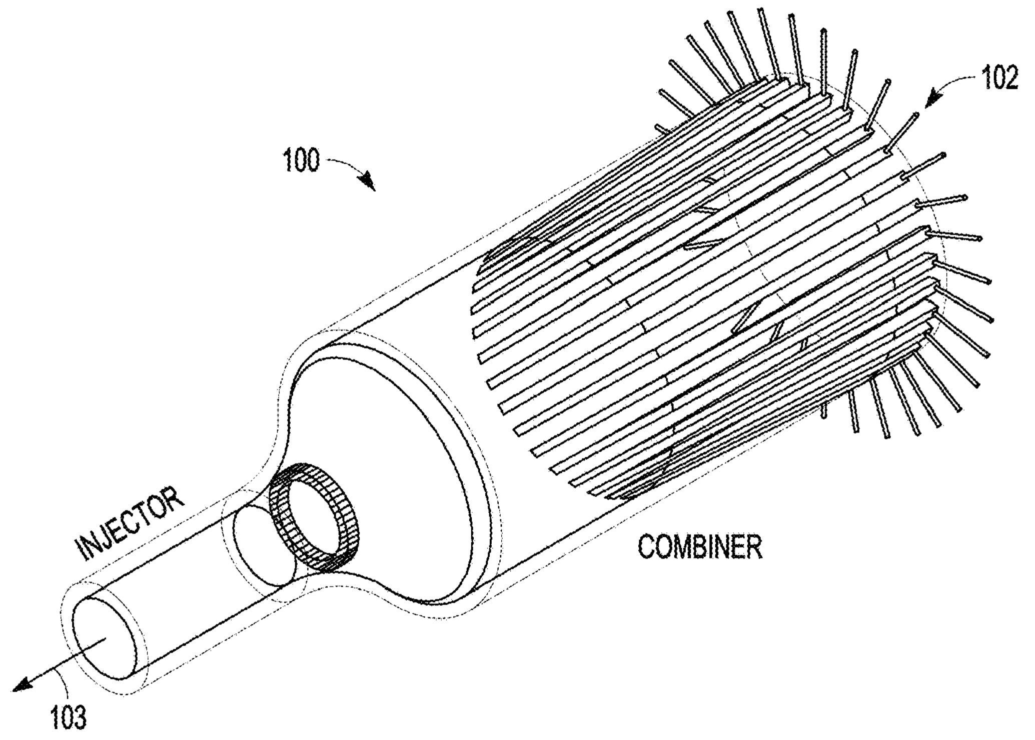
FIG. 1 illustrates a radially-fed signal injector, in accordance with some embodiments.

FIG. 1 illustrates a radially-fed signal injector, in accordance with some embodiments. The radially-fed injector illustrated in FIG. 1 is equipped with input signal lines that are perpendicular to and converge radially towards the longitudinal axis of the injector. This embodiment combines the outputs of a number of input signals delivered via coaxial cable to ridged transitions to generate a high-purity TEM input signal that is delivered to the input of an amplifying coaxial vacuum-electron device (CoVED), such as a coaxial traveling-wave tube (CoTWT). The injector comprises two sections, a combiner and an injector (FIG. 1). The combiner accepts a plurality of input signals 102 (e.g., thirty-two inputs are illustrated) in the form of vacuum coaxial transmission lines.

Figure 2:
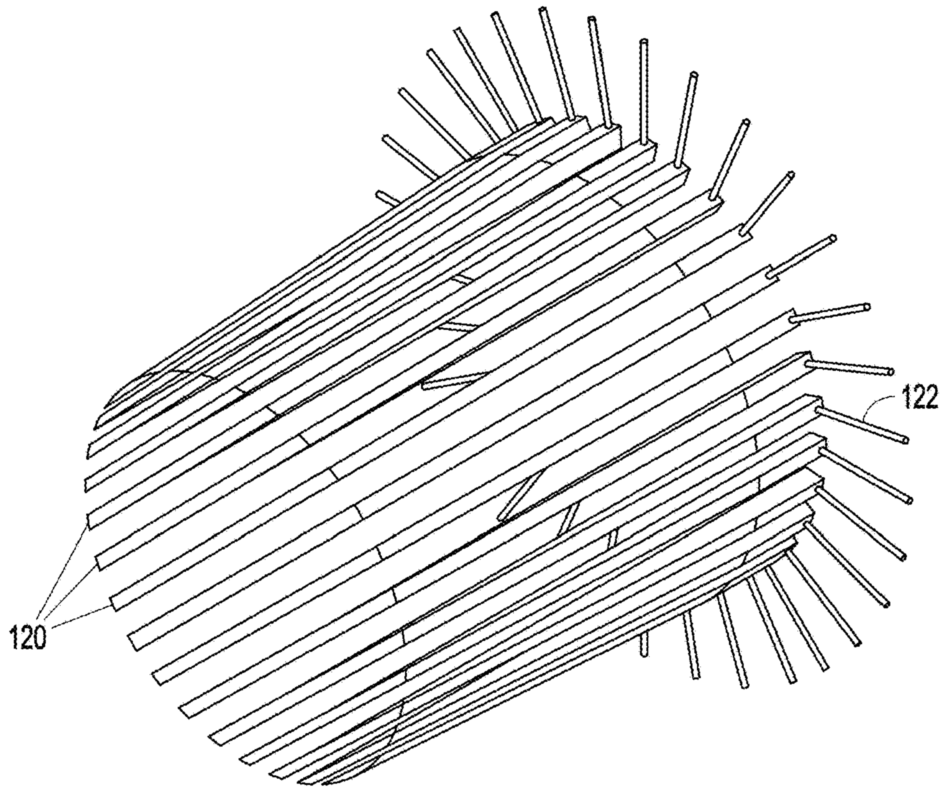
FIG. 2 illustrates conductive ridges of the radially-fed signal injector of FIG. 1, in accordance with some embodiments.
Figure 4:
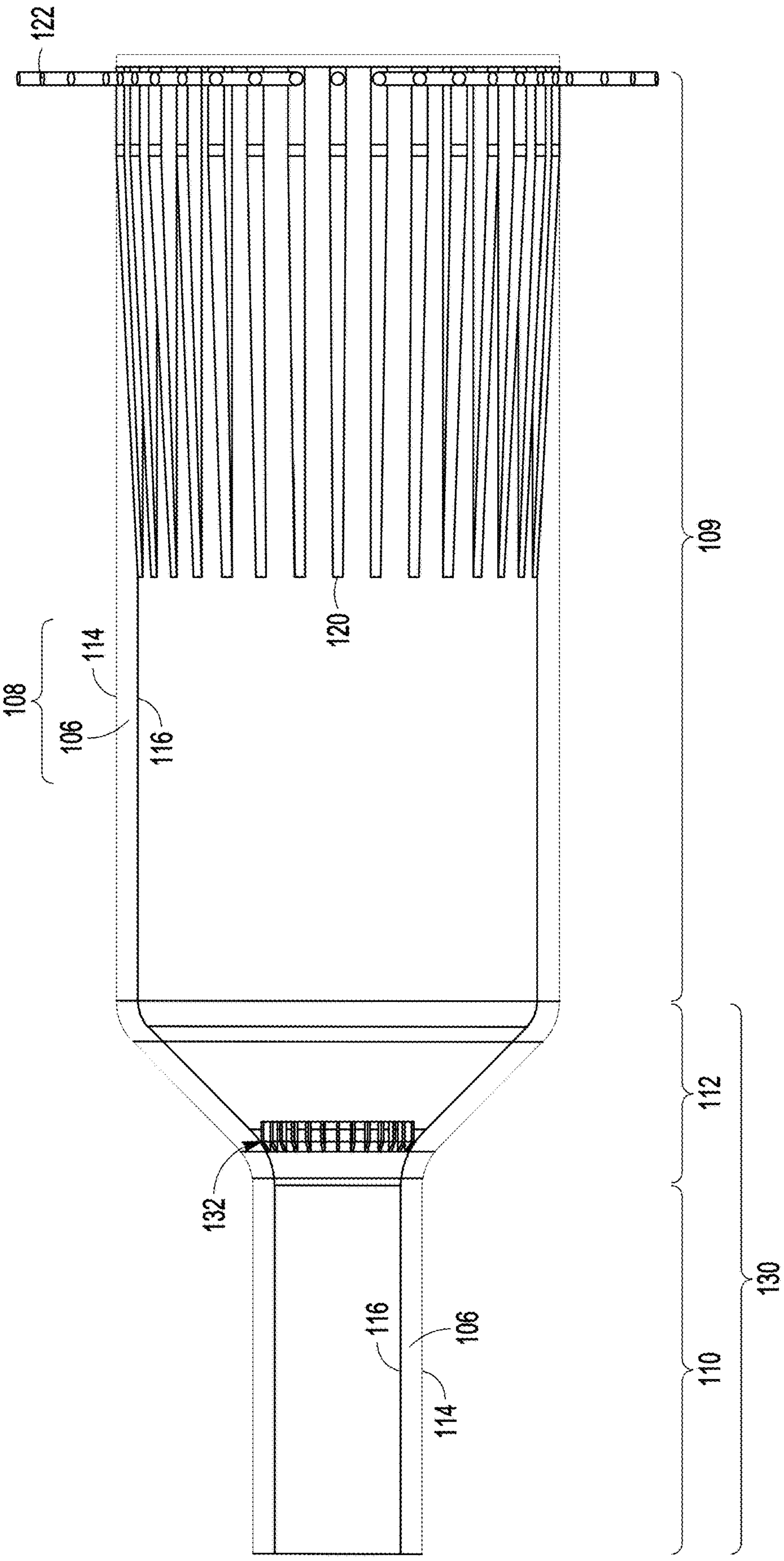
FIG. 4 illustrates a side view of the radially-fed signal injector of FIG. 1, in accordance with some embodiments.

FIG. 2 illustrates conductive ridges of the radially-fed signal injector of FIG. 1, in accordance with some embodiments. As illustrated in FIG. 2, the coaxial lines converge radially inward towards the axis of the combiner. The center conductor 122 of vacuum coaxial transmission line joins a respective ridge 120 on the center conductor of the combiner itself. The injector begins at the end of the combiner section, where it transitions from the large diameter of the combiner to the smaller diameter of the coaxial output. The injector section 130 (FIG. 4) may accommodate a plurality of electron beam apertures 132 (FIG. 6) through which electron beams pass from a cathode 134 (which may be housed inside the combiner section) (e.g., see FIG. 7) into the interaction region (e.g., a beam-wave interaction region). The injector section 130 comprises a transition 112 (FIGS. 4 and 7) from the large-diameter combiner to the input of the smaller-diameter coaxial portion 110 (FIGS. 4 and 7). In some embodiments, the injector section 130 may include a beam-wave interaction region where an electron beam and the electromagnetic wave interact, although the scope of the embodiments is not limited in this respect. The smaller-diameter coaxial portion 110 may be an input to a beam-wave interaction region such as a slow-wave structure.

Figure 3:
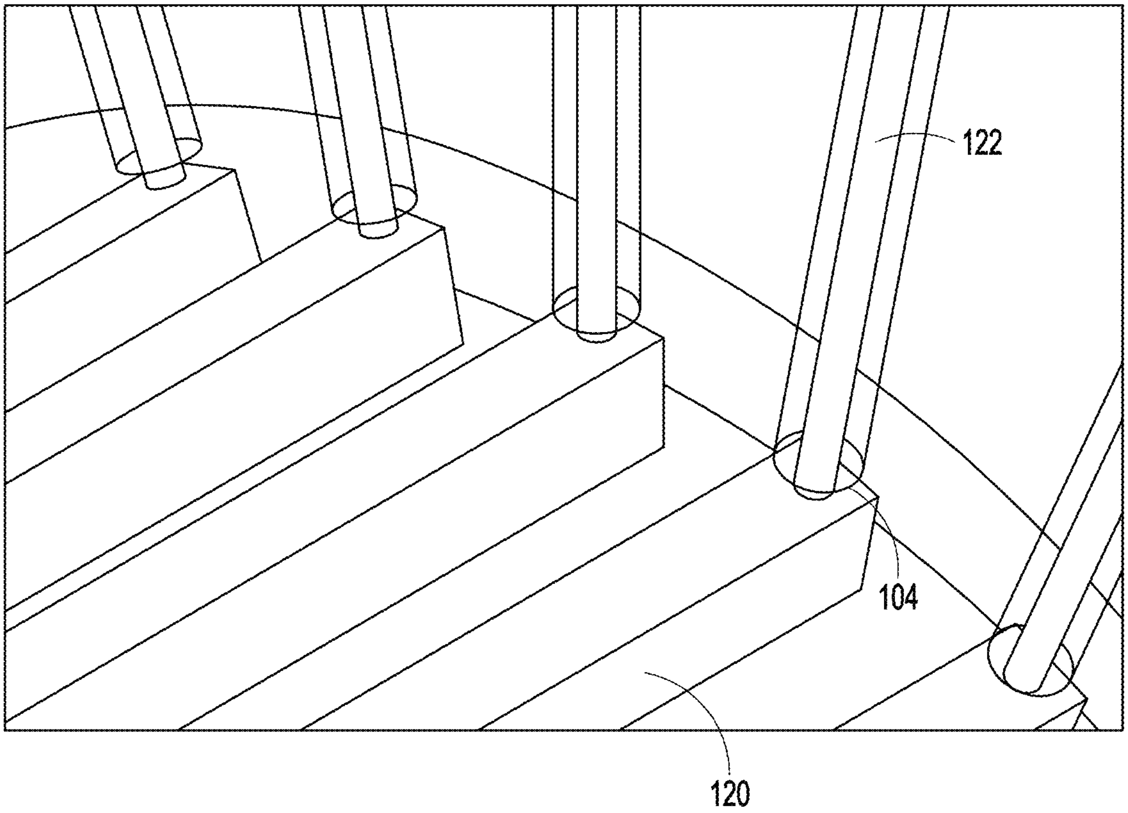
FIG. 3 illustrates the input to the radially-fed signal injector of FIG. 1, in accordance with some embodiments

FIG. 3 illustrates the input to the radially-fed signal injector of FIG. 1, in accordance with some embodiments. As shown in FIG. 3, coaxial vacuum feedthroughs 104 deliver signals from each center conductor 122 to a corresponding ridge 120.

FIG. 4 illustrates a side view of the radially-fed signal injector of FIG. 1, in accordance with some embodiments. In the detailed side view illustrated in FIG. 4 of the signal injector, the illustrated volume represents the vacuum envelope 106 between an inner conductive surface 116 and an outer conductive surface 114 of the coaxial transmission lines in which signals are free to propagate. Coaxial vacuum feedthroughs 104 (FIG. 3) deliver signals to the injector inputs and combine them in the larger-diameter portion 109. The injector section 130 comprises a transition 112 from the large-diameter combiner to the input of the smaller-diameter coaxial portion110. Also included in the injector section 130 are the electron beam apertures 132 which allow passage of electron beams from the cathode 134 (FIG. 7) through the wall and into the beam-wave interaction region.

Figure 5:
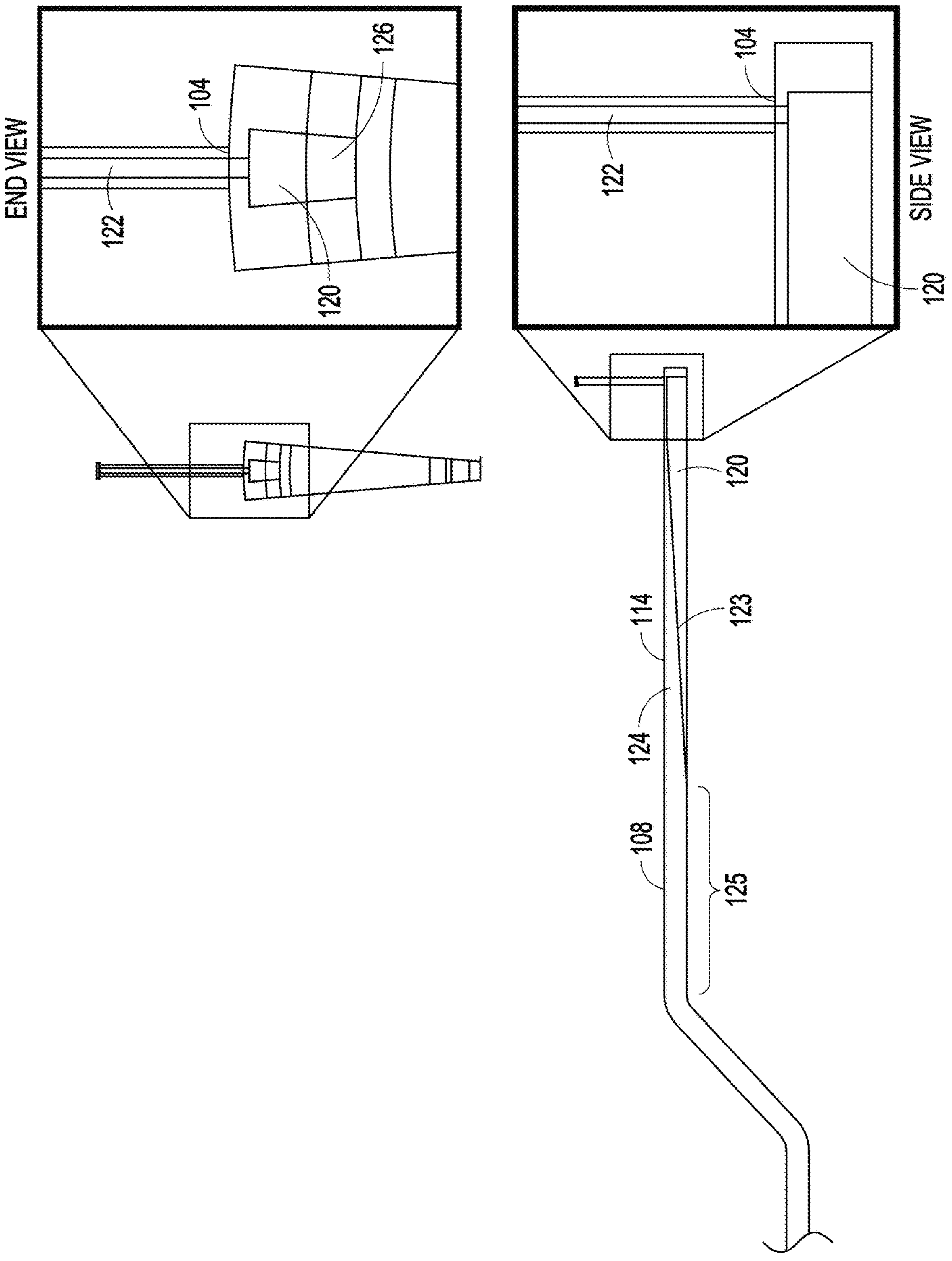
FIG. 5 illustrates an annular slice of the radially-fed signal injector of FIG. 1, in accordance with some embodiments.

The coaxial vacuum feedthroughs 104 (FIGS. 3, 5 and 6) may be compatible with Type-N connectors for added power-handling capacity, although the scope of the embodiments is not limited in this respect. The center conductor 122 of the feedthrough may be molybdenum and may have a diameter of 0.104" while the outer conductor is stainless steel and may have an inner diameter of 0.240". The outer conductor of each feedthrough joins to the outer conductor of the large-diameter coaxial input structure, and each center conductor 122 penetrates the vacuum envelope and joins to the top of one of ridges 120 that are an integral part of the center conductor of the large-diameter coaxial input structure (FIG. 5). Apart from the coaxial vacuum feedthroughs 104, all other conducting boundaries may be copper although this is not a requirement.

In some embodiments, the ridges 120 are tapered (i.e., have a taper 123 (FIG. 5)) to transform from the 50 ohm impedance of each individual coaxial input to the much lower 6.8 ohm impedance (e.g., a 10 cm inner conductor radius, 11.2 cm outer conductor radius) at the end of the tapered ridge transitions.

FIG. 5 illustrates an annular slice of the radially-fed signal injector of FIG. 1, in accordance with some embodiments. The input transition from a single coaxial input line is illustrated in more detail in FIG. 5. In these example embodiments, the annular slice of a complete combiner has an angular width of 360 deg/32=11.25 deg. The center conductor crosses a vacuum gap before joining with the top of a tapered ridge transition. When viewed end-on, each ridge transition has a trapezoidal cross section 126, wider at the top than at the bottom. In this way, the spacing between adjacent ridges is rectangular which is advantageous from a fabrication standpoint.

Figure 6:
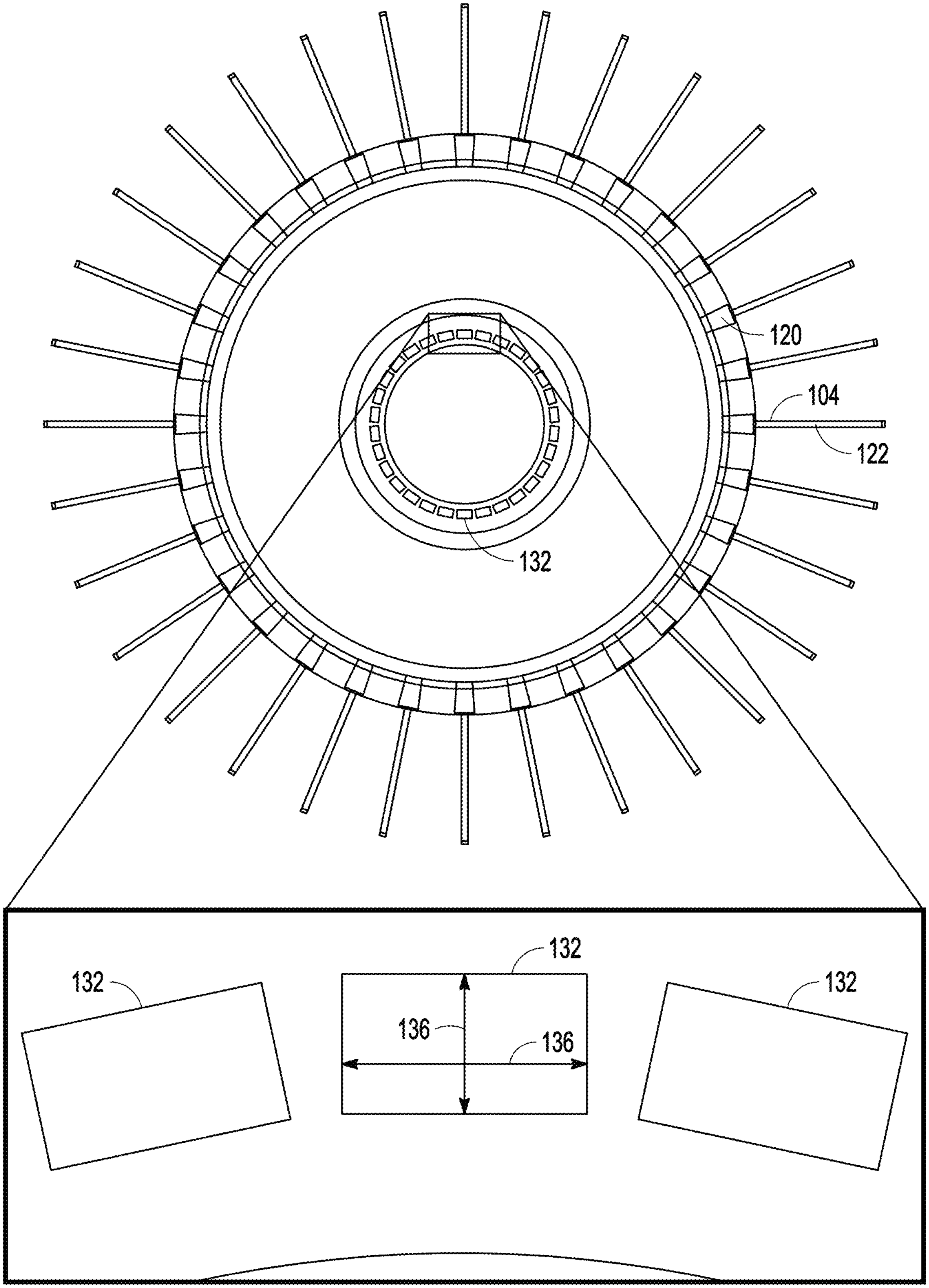
FIG. 6 illustrates an end-view of the radially-fed signal injector of FIG. 1, in accordance with some embodiments.
Figure 7:
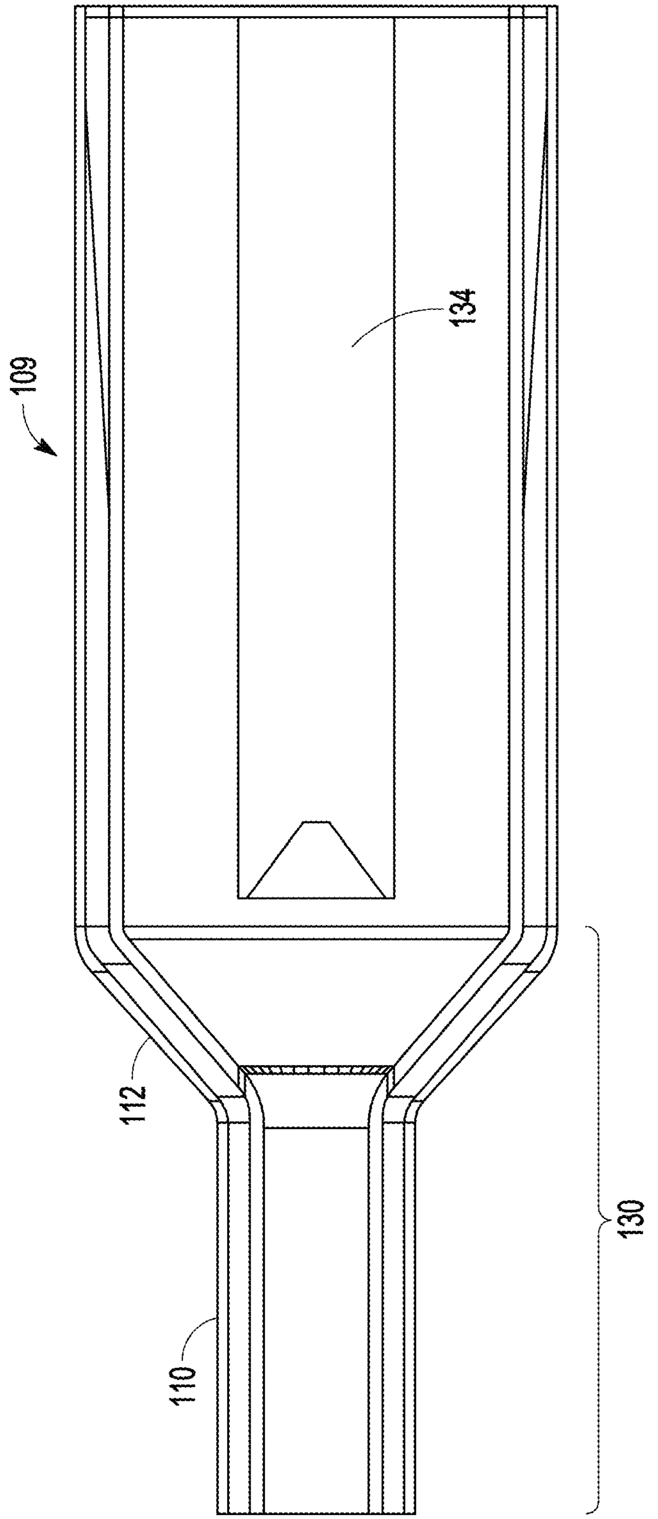
FIG. 7 illustrates a cutaway side view of a signal injector with a cathode, in accordance with some embodiments.

FIG. 6 illustrates an end-view of the radially-fed signal injector of FIG. 1, in accordance with some embodiments. Details of the electron beam apertures 132 are shown in FIG. 6 which is a view of the injector looking from the output end towards the plurality of coaxial inputs. The beam apertures 132 form a circle around the axis of the injector; each aperture being a rectangular port. While individual apertures act as waveguides in cutoff, the short length of these waveguides may allow excessive coupling of evanescent fields into the interior of the injector if the aperture dimensions 136 are not properly chosen.

Embodiments are directed to a radially-fed RF power combiner 100 configured to combine a plurality of input signals 102 and generate a single fundamental-mode transverse electromagnetic (TEM) output 103 (FIG. 1). The combiner comprises a vacuum coaxial transmission line 108 having a plurality of coaxial vacuum feedthroughs 104 configured to receive the input signals 102 (FIG. 1). The coaxial vacuum feedthroughs 104 may be arranged radially around the vacuum coaxial transmission line 108. In embodiments, the vacuum coaxial transmission line 108 comprises a vacuum envelope 106 having an annular shape. The vacuum envelope 106 may be provided between an inner conductive surface 116 and an outer conductive surface 114 (FIG. 4). In these embodiments, the inner conductive surface 116 may be an inner conductor of the vacuum coaxial transmission line 108. In these embodiments, the inner conductive surface may comprise a cylindrical conductive base and a plurality of radially-aligned conductive ridges azimuthally distributed within a vacuum envelope of the vacuum coaxial transmission line 108. In these embodiments, each of the conductive ridges 120 may be coupled to a center conductor 122 of a corresponding one of the coaxial vacuum feedthroughs 104 (FIG. 3). In embodiments, the conductive ridges 120 may have a taper 123 (FIG. 5) to provide an increasing gap 124 (FIG. 5) between the top of the conductive ridges 120 and the outer conductive surface 114 (FIG. 5).

In embodiments, the input signals 102 may be in the range of 4.5 GHz to 5.5 GHZ, although this is not a requirement as other microwave frequency and millimeter-wave frequency ranges may also be used.

In embodiments, the increasing gap 124 may be configured to gradually transition the input signals 102 from each coaxial vacuum feedthrough 104 to quasi-TEM mode signals within the vacuum envelope 106 of the vacuum coaxial transmission line 108. In these radial-feed embodiments, the coaxial vacuum feedthroughs 104 may be arranged radially around the vacuum coaxial transmission line 108 and the center conductors 122 of the coaxial vacuum feedthroughs 104 are perpendicular to the conductive ridges 120 providing a plurality of radial feeds.

In embodiments, the conductive ridges 120 may be configured to allow the quasi-TEM mode signals from each conductive ridge 120 to spread azimuthally within the vacuum envelope 106 and combine to generate a composite TEM mode signal that propagates within a portion 125 of the vacuum envelope 106 without the conductive ridges 120, the composite TEM mode signal corresponding to the fundamental-mode TEM output 103. In these embodiments, the fundamental-mode TEM output 103 may be a substantially pure TEM mode signal. In these embodiments, the TEM mode signals that propagate along the conductive ridges 120 are referred to as "quasi-TEM mode signals" since the propagating electric field will have a small z-component due to the taper of the conductive ridges 120. A pure TEM mode signal, on the other hand, has no axial-field component (i.e., no component in the z-direction). The z-component/direction is parallel to the axis of the vacuum coaxial transmission line 108.

In embodiments, when each of the input signals 102 received at the coaxial vacuum feedthroughs 104 have substantially the same frequency and substantially the same phase, the composite TEM mode signal may be substantially devoid of higher-order waveguide modes. In these embodiments, dimensions of conductive ridges 120 and the length of the vacuum coaxial transmission line 108, among other things, may be selected so that a high-purity TEM mode output may be produced. Accordingly, a high-power output signal may be generated by the coherent combining of many input signals 102. In these embodiments, the phase difference between the input signals 102 may be constrained to a value close to or near zero. In these embodiments, the tapered conductive ridges 120 provide a smooth transition for signals on the input coaxial lines coupled to the coaxial vacuum feedthroughs 104 (i.e., 50 ohm) to the vacuum coaxial transmission line 108 which has a larger diameter (and a much lower impedance <<50 ohms).

In embodiments, the conductive ridges 120 may have a trapezoidal cross section 126 (FIG. 5) and may provide a rectangular gap between each conductive ridge 120 in the radial arrangement. In these embodiments, the machined gaps separating adjacent ridges 120 are rectangular for ease of fabrication, while the ridges themselves have a trapezoidal cross-sectional profile.

In embodiments, each coaxial vacuum feedthrough 104 may be configured for receiving one of the input signals 102. In these embodiments, a number of the coaxial vacuum feedthroughs 104 comprises one or more of: an odd number, an even number, and an integer power of two. In these embodiments, the number of inputs that may be combined may be as few as 8 or 10 and may range up to 50 or more, although the scope of the embodiments is not limited in this respect.

In embodiments, the vacuum coaxial transmission line 108 comprises a larger diameter portion 109, a smaller-diameter coaxial portion 110 and a transition 112 (FIG. 4). In these embodiments, the transition 112 may be provided between the larger diameter portion 109 and the smaller-diameter portion 110. In these embodiments, the larger diameter portion 109 may operate as a combiner and includes the conductive ridges and the smaller-diameter coaxial portion 110 may provide the composite TEM mode signal as the fundamental-mode TEM output 103.

In embodiments, the vacuum envelope 106 provides a region between the inner conductive surface 116 and the outer conductive surface 114 to maintain a vacuum therein. In some embodiments, the inner conductive surface 116, including the ridges 120, and the outer conductive surface 114 of the vacuum coaxial transmission line 108 comprise copper. In some embodiments, the coaxial vacuum feedthroughs 104 may comprise Type-N coaxial vacuum feedthroughs with molybdenum center conductors 122 and stainless steel outer conductors 118. In some embodiments, the copper may be Oxygen Free High Thermal Conductivity Copper (OFHC), although the scope of the embodiments is not limited in this respect.

In embodiments, the radially-fed RF power combiner 100 may further include a plurality of electron-beam (E-beam) apertures 132 (FIG. 4 and FIG. 6) within injector section 130 (FIG. 4) and may be arranged to allow passage of electrons emitted by a cathode 134 (FIG. 7) into a beam-wave interaction region between the center conductor and outer conductor of the vacuum coaxial transmission line 108. In these embodiments, the injector section 130 comprises a transition 112 from the large-diameter combiner to the smaller-diameter portion 110 (i.e., the input to the beam-wave interaction region).

In these embodiments, the cathode 134 may be housed within a hollow portion of the larger diameter portion 109 of the vacuum coaxial transmission line 108. In some embodiments, the electron beam apertures 132 may comprise holes in the wall separating the cathode-housing interior from a beam-wave interaction region. In these embodiments, dimensions 136 (FIG. 6) of the apertures 132 may be selected to allow passage of electrons and inhibit passage of RF energy.

In embodiments, the smaller-diameter portion 110, may operate as an injector and may be coupled to an amplifying coaxial vacuum-electron device (CoVED). In these embodiments, the fundamental-mode TEM output 103 is injected into an input of the amplifying CoVED. In these embodiments, the amplifying CoVED may comprise any type of amplifying coaxial vacuum-electron device including, for example, a coaxial klystron, a coaxial traveling-wave tube, etc.

Embodiments are also directed to a method of combining a plurality of input signals. In these embodiments, the method may comprise receiving the input signals 102 through a plurality of coaxial vacuum feedthroughs 104 arranged radially around a vacuum coaxial transmission line 108. The method may also comprise transitioning the input signals 102 within a vacuum envelope 106 of the vacuum coaxial transmission line 108 to quasi-TEM mode signals along a plurality of tapered conductive ridges 120 of an inner conductive surface 116 of the vacuum coaxial transmission line 108. In these embodiments, the method may also comprise azimuthally spreading and combining the quasi-TEM mode signals from each conductive ridge 120 within the vacuum envelope 106 to generate a composite TEM mode signal that propagates within a portion 125 of the vacuum envelope 106 without the conductive ridges 120. In these embodiments, the composite TEM mode signal may comprise a single fundamental-mode TEM output 103.

In these embodiments, the method may comprise gradually transitioning, with the increasing gap 124, the input signals from each coaxial vacuum feedthrough 104 to quasi-TEM mode signals within the vacuum envelope 106 of the vacuum coaxial transmission line 108. In these embodiments, the method may further comprise combining the input signals in the larger diameter portion and injecting the fundamental-mode TEM output 103 from the smaller-diameter portion 110 into an input of an amplifying coaxial vacuum-electron device (CoVED), although the scope of the embodiments is not limited in this respect.

Embodiments are also directed to a radially-fed signal injector. In these embodiments, the radially-fed signal injector may comprise an a radially-fed RF power combiner 100 comprising a vacuum coaxial transmission line 108 having a plurality of coaxial vacuum feedthroughs 104 configured to receive the input signals 102. In these embodiments, the coaxial vacuum feedthroughs 104 may be arranged radially around the vacuum coaxial transmission line 108. The radially-fed signal injector may also comprise a cathode 134 housed within a hollow portion of the larger diameter portion 109 of the vacuum coaxial transmission line 108. In these embodiments, the vacuum coaxial transmission line 108 may comprise a vacuum envelope 106 having an annular shape. The vacuum envelope 106 may be provided between an inner conductive surface 116 and an outer conductive surface 114. The inner conductive surface 116 may be an inner conductor of the vacuum coaxial transmission line 108. In these embodiments, the inner conductive surface may comprise a cylindrical conductive base and a plurality of radially-aligned conductive ridges azimuthally distributed within a vacuum envelope of the vacuum coaxial transmission line 108. Each conductive ridge 120 may be coupled to a center conductor 122 of a corresponding one of the coaxial vacuum feedthroughs 104. In these embodiments, the conductive ridges 120 have a taper 123 to provide an increasing gap 124 (FIG. 5) between the top of the conductive ridges 120 and the outer conductive surface 114. In some of these embodiments, the coaxial signal injector may also include a plurality of electron-beam (E-beam) apertures 132 (FIG. 4 and FIG. 6) within an injector section 130 arranged to allow passage of electrons emitted by the cathode into a beam-wave interaction region between the center conductor and an outer conductor of the vacuum coaxial transmission line 108.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A radially-fed RF power combiner configured to combine a plurality of input signals and generate a fundamental-mode transverse electromagnetic (TEM) output, the combiner comprising:

a vacuum coaxial transmission line having a plurality of coaxial vacuum feedthroughs configured to receive the input signals, the coaxial vacuum feedthroughs arranged radially around the vacuum coaxial transmission line;

wherein an inner conductive surface of the vacuum coaxial transmission line comprises a cylindrical conductive base and a plurality of radially-aligned conductive ridges azimuthally distributed within a vacuum envelope of the vacuum coaxial transmission line, wherein a respective one of the conductive ridges is coupled to a center conductor of a corresponding one of the coaxial vacuum feedthroughs, and wherein the conductive ridges have a respective taper to provide an increasing gap between the conductive ridges and an outer conductive surface of the vacuum coaxial transmission line.

2. The radially-fed RF power combiner of claim 1, wherein the vacuum coaxial transmission line comprises a vacuum envelope having an annular shape, the vacuum envelope provided between the inner conductive surface and the outer conductive surface, and wherein the increasing gap is configured to transition the input signals from each coaxial vacuum feedthrough to quasi-TEM mode signals within the vacuum envelope of the vacuum coaxial transmission line.

3. The radially-fed RF power combiner of claim 2, wherein the conductive ridges are configured to allow the quasi-TEM mode signals from each conductive ridge to spread azimuthally within the vacuum envelope to generate a composite TEM mode signal that propagates within a portion of the vacuum envelope without the conductive ridges, the composite TEM mode signal corresponding to the fundamental-mode TEM output.

4. The radially-fed RF power combiner of claim 3, wherein when each of the input signals received at the coaxial vacuum feedthroughs have substantially a same frequency and substantially a same phase, the composite TEM mode signal being substantially devoid of higher-order waveguide modes.

5. The radially-fed RF power combiner of claim 4, wherein the conductive ridges have a trapezoidal cross section to provide a rectangular gap between each radially aligned conductive ridge.

6. The radially-fed RF power combiner of claim 5, wherein a respective one of the coaxial vacuum feedthroughs is configured for receiving a corresponding one of the input signals, and wherein a number of the coaxial vacuum feedthroughs comprises one or more of: an odd number, an even number, and an integer power of two.

7. The radially-fed RF power combiner of claim 6, wherein the vacuum coaxial transmission line comprises a larger diameter portion, a smaller-diameter portion and a transition portion, the transition portion located between the larger diameter portion and the smaller-diameter portion, wherein the larger diameter portion is configured to operate as a combiner and includes the conductive ridges, and wherein the smaller-diameter portion is configured to provide the composite TEM mode signal as the fundamental-mode TEM output.

8. The radially-fed RF power combiner of claim 7, wherein the vacuum envelope provides a region between the inner conductive surface and the outer conductive surface to maintain a vacuum therein.

9. The radially-fed RF power combiner of claim 7, wherein the inner conductive surface, including the ridges, and the outer conductive surface of the vacuum coaxial transmission line comprises copper.

10. The radially-fed RF power combiner of claim 7, further comprising a plurality of electron-beam (E-beam) apertures within an injector section to allow passage of electrons emitted by a cathode into a beam-wave interaction region of the vacuum coaxial transmission line, wherein the injector section comprises a transition to the smaller-diameter portion of the vacuum coaxial transmission line, and wherein the cathode is housed within a hollow portion of the larger diameter portion of the vacuum coaxial transmission line.

11. The radially-fed RF power combiner of claim 7, wherein the smaller-diameter portion is coupled to an amplifying coaxial vacuum-electron device (CoVED), and wherein the fundamental-mode TEM output is injected into an input of the amplifying CoVED.

12. A method of combining a plurality of input signals, the method comprising:

receiving the input signals through a plurality of coaxial vacuum feedthroughs arranged radially around a vacuum coaxial transmission line;

transitioning the input signals within a vacuum envelope of the vacuum coaxial transmission line to quasi-TEM mode signals along a plurality of tapered conductive ridges of an inner conductive surface of the vacuum coaxial transmission line; and azimuthally spreading and combining the quasi-TEM mode signals from each conductive ridge within the vacuum envelope to generate a composite TEM mode signal that propagates within a portion of the vacuum envelope without the conductive ridges, the composite TEM mode signal comprising a fundamental-mode TEM output.

13. The method of claim 12, wherein the vacuum envelope has an annular shape, the vacuum envelope provided between the inner conductive surface and an outer conductive surface, the inner conductive surface being an inner conductor of the vacuum coaxial transmission line, wherein the conductive ridges are radially aligned and azimuthally distributed within the vacuum envelope of the vacuum coaxial transmission line, wherein a respective one of the conductive ridges is coupled to a center conductor of a corresponding one of the coaxial vacuum feedthroughs, and wherein the conductive ridges have a respective taper to provide an increasing gap between the conductive ridges and the outer conductive surface.

14. The method of claim 13, wherein the transitioning of the input signals comprises gradually transitioning, with the increasing gap, the input signals from each coaxial vacuum feedthrough to the quasi-TEM mode signals within the vacuum envelope of the vacuum coaxial transmission line.

15. The method of claim 14, wherein the vacuum coaxial transmission line comprises a larger diameter portion, a smaller-diameter portion and a transition portion, the transition portion located between the larger diameter portion and the smaller-diameter portion, wherein the larger diameter portion is configured to operate as a combiner and includes the conductive ridges, and wherein the smaller-diameter portion is configured to provide the composite TEM mode signal as the fundamental-mode TEM output.

16. The method of claim 15, wherein the method further comprises:

combining the input signals in the larger diameter portion; and injecting the fundamental-mode TEM output from the smaller-diameter portion into an input of an amplifying coaxial vacuum-electron device (CoVED).

17. A radially-fed signal injector, comprising:

an RF power combiner comprising a vacuum coaxial transmission line having a plurality of coaxial vacuum feedthroughs configured to receive a plurality of input signals, the feedthroughs arranged radially around the vacuum coaxial transmission line; and a cathode housed within a hollow portion of a center conductor of the vacuum coaxial transmission line, wherein the vacuum coaxial transmission line comprises a vacuum envelope having an annular shape, the vacuum envelope provided between an inner conductive surface and an outer conductive surface, the inner conductive surface being an inner conductor of the vacuum coaxial transmission line, wherein the inner conductive surface of the vacuum coaxial transmission line comprises a cylindrical conductive base and a plurality of radially-aligned conductive ridges azimuthally distributed within the vacuum envelope of the vacuum coaxial transmission line, wherein a respective one of the conductive ridges is coupled to a center conductor of a corresponding one of the coaxial vacuum feedthroughs, and wherein the conductive ridges have a respective taper to provide an increasing gap between the conductive ridges and the outer conductive surface.

18. The radially-fed signal injector of claim 17, wherein the increasing gap allows the input signals from each coaxial vacuum feedthrough to transition to quasi-TEM mode signals within the vacuum envelope of the vacuum coaxial transmission line.

19. The radially-fed signal injector of claim 18, wherein the conductive ridges are configured to allow the quasi-TEM mode signals from each conductive ridge to spread azimuthally within the vacuum envelope to generate a composite TEM mode signal that propagates within a portion of the vacuum envelope without the conductive ridges, the composite TEM mode signal being a fundamental-mode TEM output.

20. The radially-fed signal injector of claim 19, further comprising a plurality of electron-beam (E-beam) apertures within an injector section to allow passage of electrons emitted by the cathode into a beam-wave interaction region between the center conductor and an outer conductor of the vacuum coaxial transmission line.

* * * * *